May 19, 1959 H. J. FORTUNE 2,887,321

RECORD SUPPORTING AND FEEDING MEANS FOR RECORD CHANGING MECHANISM

Filed Sept. 4, 1953 4 Sheets-Sheet 1

INVENTOR
Henry James Fortune
by Dang [illegible] his atty

May 19, 1959 H. J. FORTUNE 2,887,321

RECORD SUPPORTING AND FEEDING MEANS FOR RECORD CHANGING MECHANISM

Filed Sept. 4, 1953 4 Sheets-Sheet 2

INVENTOR
Henry Jame Fortune
by Darby & Darby
his atty

May 19, 1959 H. J. FORTUNE 2,887,321

RECORD SUPPORTING AND FEEDING MEANS FOR RECORD CHANGING MECHANISM

Filed Sept. 4, 1953 4 Sheets-Sheet 3

INVENTOR

Henry James Fortune

By Atty.

INVENTOR
Henry James Fortune
by Davis ... his atty

United States Patent Office 2,887,321

Patented May 19, 1959

2,887,321

RECORD SUPPORTING AND FEEDING MEANS FOR RECORD CHANGING MECHANISM

Henry James Fortune, Swindon, England, assignor to The Garrard Engineering and Manufacturing Company Limited, Swindon, England Application September 4, 1953, Serial No. 378,517

7 Claims. (Cl. 274—10)

This invention relates to record supporting and feeding means for record changing mechanism of the type wherein the records are supported at the centre hole upon the shoulder of an offset spindle and at the edge by a platform device having an associated feeding tooth.

With present day sizes of records it is necessary or desirable that all sizes of records shall be playable on the same record changer and it is an object to provide an improved platform device which is suitable for say 12", 10" and 7" records by a simple displacement to the appropriate position, an aim of the invention being to provide a record edge supporting surface which is maintained at the appropriate angle for supporting the edges of the records.

According to the invention the record edge supporting surface or element is mounted for displacement upon a lever or link system comprising a parallel motion linkage, said surface being common to all sizes of records and having associated therewith a single record feeding tooth, the supporting surface being displaceable by a relative movement between the levers or links of the parallelogram.

The displacement of the levers of the parallel motion linkage may be effected by a manually operable cam lever which holds the parts in their adjusted positions and sets the pick-up to conform to the setting of the record support.

The feeding tooth is actuated by a lever which is pivoted upon the parallel motion linkage and is displaceable therewith.

Cover means shaped to conform to the platform may be provided and pivotally supported upon an upper forward pivot of the parallel motion linkage and having a link attachment at its lower end to a fixed bracket, whereby the cover moves with and covers the parallel motion linkage at all positions.

Figures 1, 2:
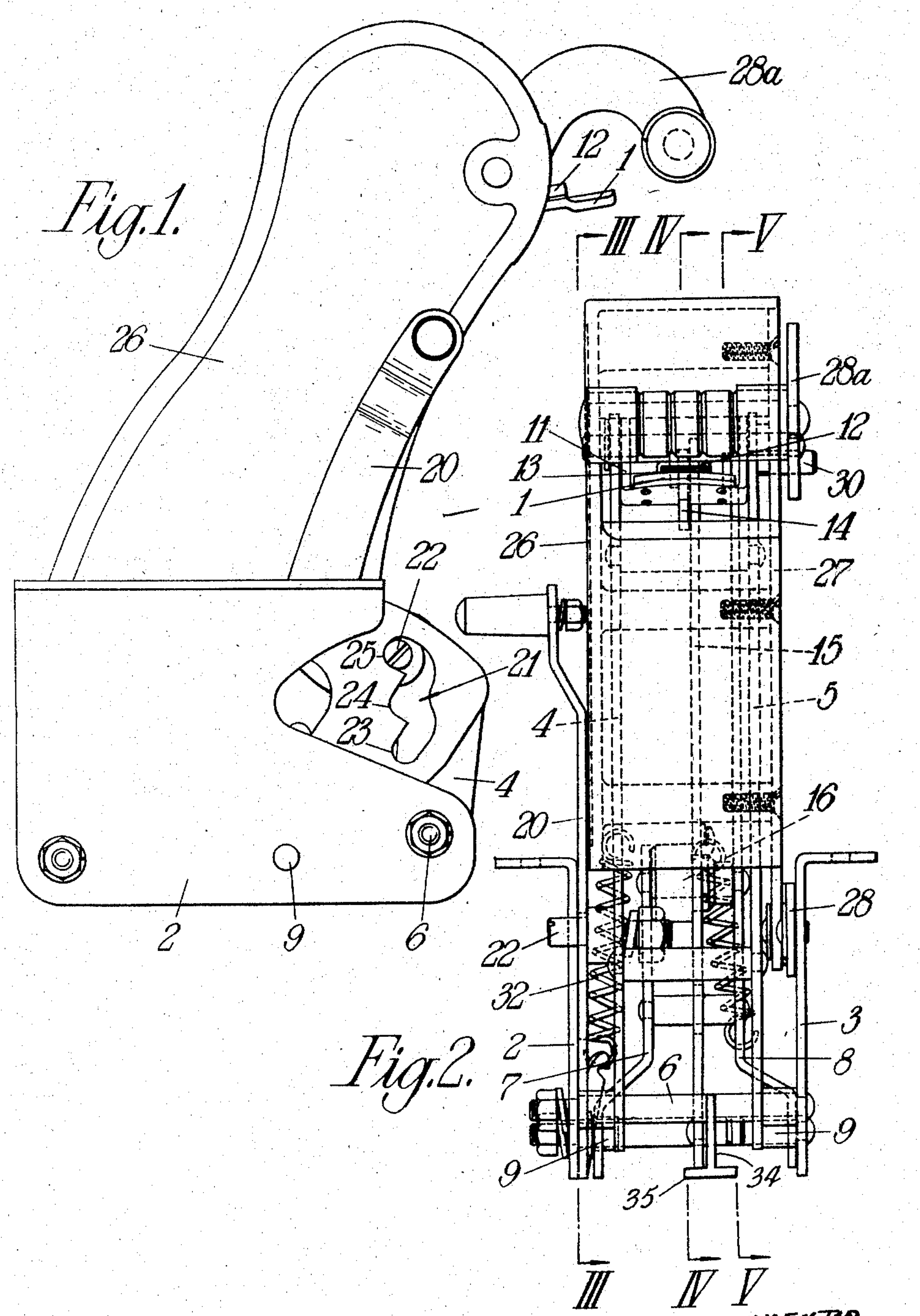
Figure 1 is a front view of the device.
Figure 2 is an end elevation.
Figure 3:
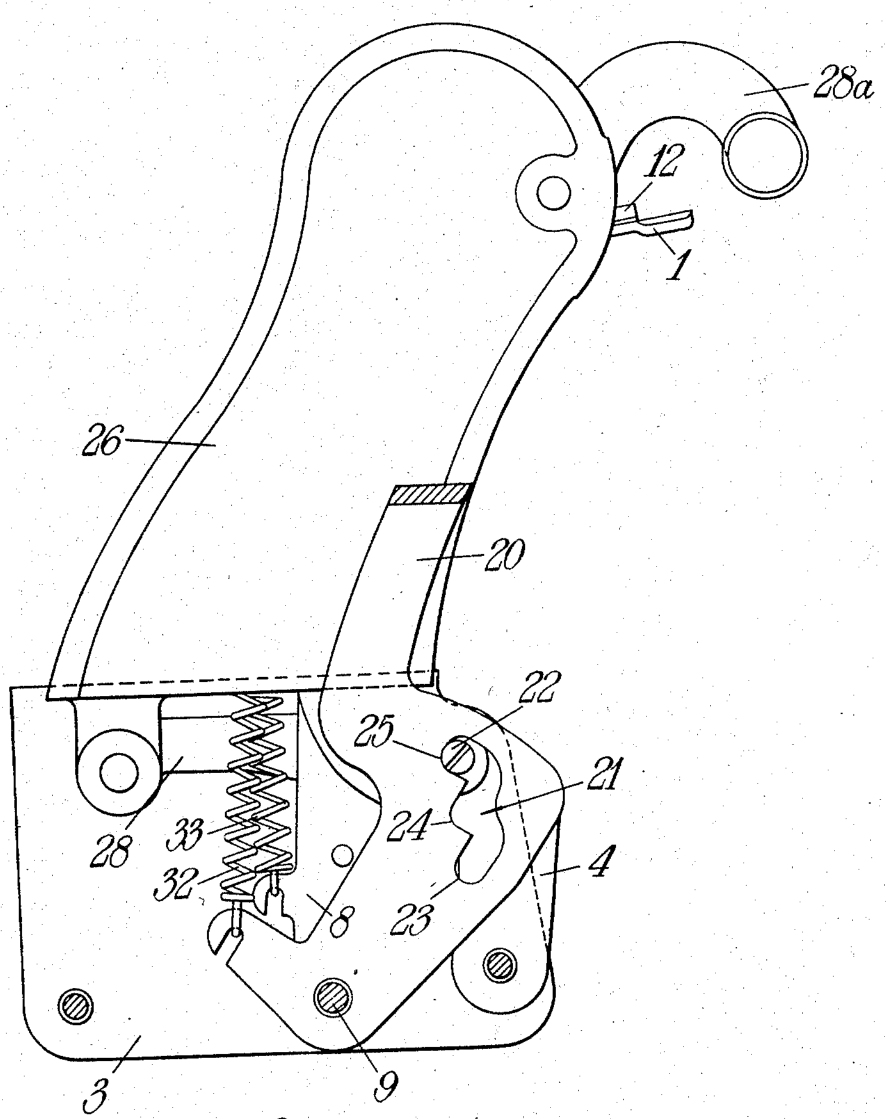
Figure 3 is a section on line III—III of Figure 2.
Figures 4, 6:
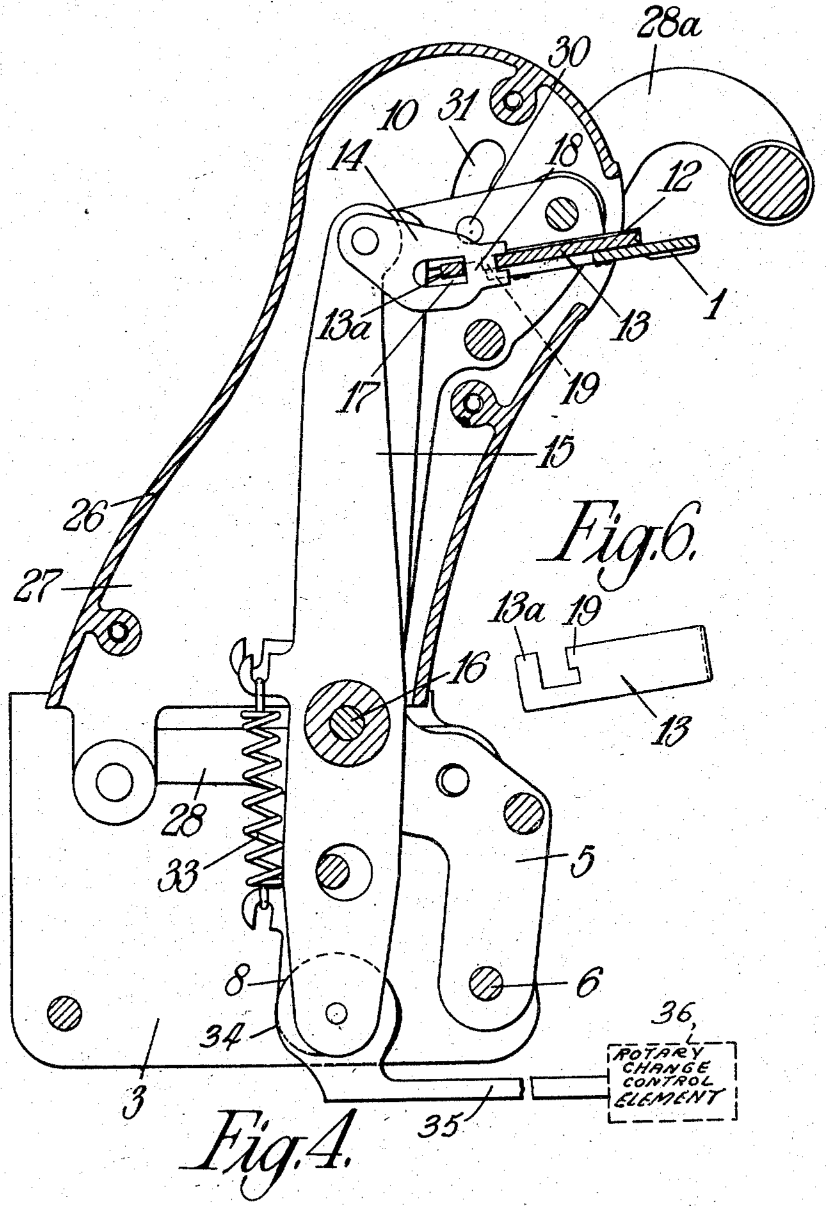
Figure 4 is a section on line IV—IV of Figure 2.
Fig. 6 is a plan view of the feeding element or tooth.
Figure 5:
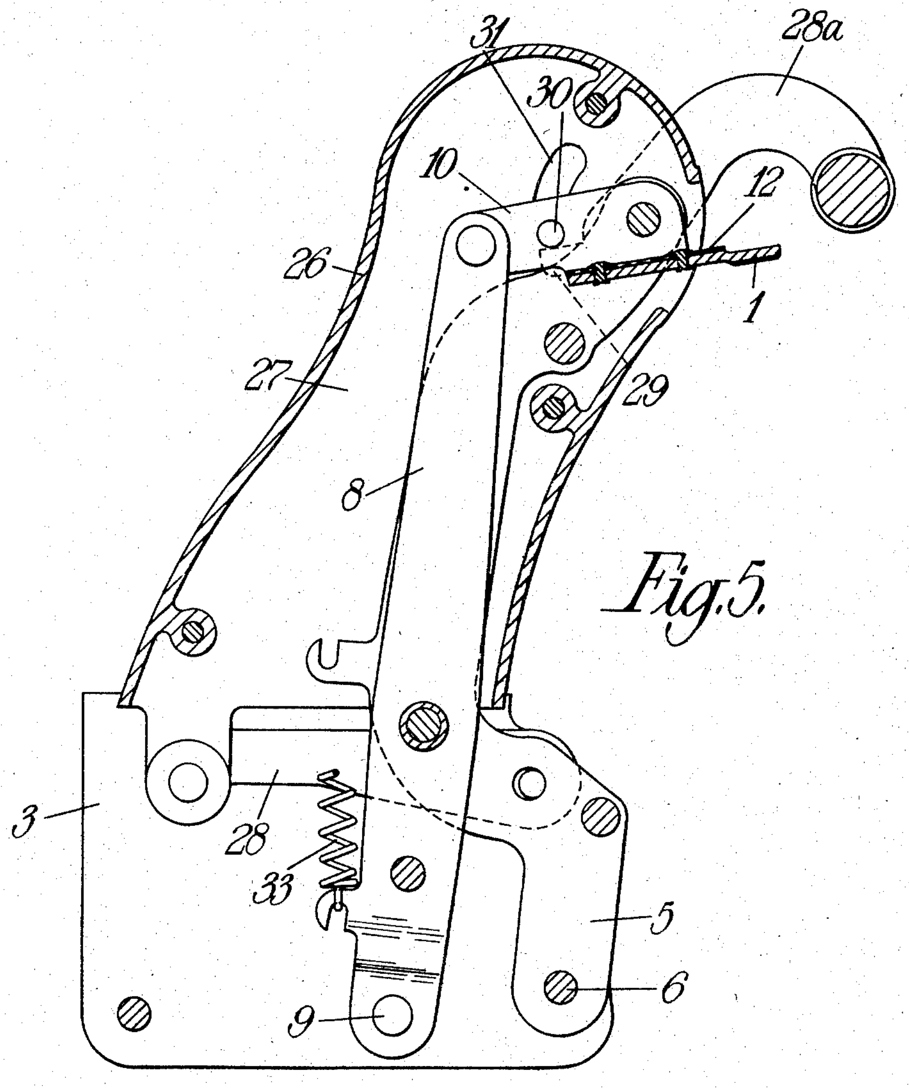
Figure 5 is a section on line V—V of Figure 2.

In carrying the invention into effect according to one convenient mode the supporting platform or surface 1 for the edge of the records is mounted upon a system of levers forming a parallel motion linkage, such levers or links being pivotally mounted upon bracket elements 2, 3, depending from the motor board, the latter being slotted so that the levers extend upwardly through the slot to a suitable position above the motor board. The levers or links of the parallel motion linkage comprise a forward spaced pair of levers 4, 5, which are pivoted at their lower ends on a rod 6 carried by the brackets at a forward point, and a second pair of spaced levers 7, 8, pivoted at their lower ends on the brackets at a point 9 to the rear of said point or rod 6, the rear pivotal point 9 being somewhat lower than the forward point 6. The brackets thus form the lower connecting links or levers of the parallel motion linkage. The upper connecting lever element of the parallel motion linkage comprises a short link 10 connecting the upper end of the forward lever 5 and the corresponding upper end of the rearward lever 8. This upper connecting link 10 is formed integrally with the supporting element 1 which extends across the space between the levers and is provided with a lug 11 pivotally connected to the other forward lever 4. The supporting platform 1 is provided with a guiding element 12 for a feeding tooth 13 which is displaceable within the guide to displace the lowest record from the support. The feeding tooth 13 is connected by a link 14 which is pivoted to the upper end of a pivoted record feed lever 15, the lower end of which is pivotally connected to an upwardly extending arm 34 of a feeding link 35 which is actuated by a crank pin on a rotary change control element 36.

The forward upright levers 4, 5 of the parallel motion linkage are conveniently of bent form extending away from the turntable.

The lever 7 of the rear upright levers is conveniently shortened and the record tooth feed lever 15 is pivoted on a spindle 16 connecting the upper end of the shortened lever and its companion lever 8.

The feeding tooth 13 is connected to the actuating link 14 by means which provide a universal joint. Thus the rear end 13a of the tooth 13 is hook shaped to engage in an aperture 17 in the link and embrace a cross piece 18 on the link. The hooking part 19 of the tooth prevents lateral separation. The actuating link 14 lies in a vertical plane and is guided in a slot in the supporting element 1 and in a slot in the element 12 between the levers 4, 5.

The system of levers 4, 5 and 7, 8 forming the parallel motion linkage is adapted to be adjusted for supporting the edges of 12", 10" and 7" records by means of a manually operable adjusting lever 20 pivotally mounted on the bracket 2 at axis 9 and extending upwardly through the slot in the motor board. This lever 20 is provided with a cam slot formation 21 adapted to engage a pin 22 on the main lever 4 of the parallel motion linkage, the cam formation having a series of appropriate detents 23, 24, 25, which hold the platform in its adjusted positions, corresponding to the 12", 10" and 7" positions.

The pin 22 is eccentric to a supporting boss so that it may be adjusted and locked in position.

The adjusting lever 20 is connected by a suitable linkage to means for setting the tone arm according to the size of the records in the stack.

The parallel motion linkage is adapted to be enclosed by a suitable cover means which is movable with the lever system in its adjusted positions. This cover device conveniently comprises a deeply dished cover 26 which is removably mounted on a side plate 27, the latter being secured in position by a pivotal connection on the upper pivot of the forward parallel motion linkage lever 5, while at its base the plate is linked by a suitable link 28 pivoted on the main bracket 3. The cover member 26 is provided with an aperture which engages the opposite end of the pivot before mentioned so that it is properly supported and is slotted forwardly to accommodate the record supporting surface 1 and feeding tooth 13.

The manually actuating and setting lever 20, and the tooth feeding lever are provided with suitable spring biassing means comprising a coil spring 32 engaging hooks on the lever 20 and lever 4, and a coil spring 33 engaging hooks on lever 15 and lever 8.

The cover means 26, 27 is suitably shaped so that the parallel motion linkage levers are covered at all positions of the adjustable platform 1 and it will be appreciated therefore that a portion of the cover when in the 10" and 12" positions will extend below the plane of the motor board, the latter being suitably slotted to receive the rear of the cover. The cover 26, 27 is preferably shaped so that it presents substantially the same appearance whatever its adjusted position. On the forward pivotal axis a pivot steadying arm 28a is provided which has a rearward extending portion 29 adapted to engage a pin 30 mounted on the upper link 10 of the parallel motion linkage and extending through an aperture 31 in the cover plate 27.

It will be noted that the lower end of the feeding tooth lever 15 partakes of no movement in the adjusting of the platform to its various positions, said lower end only being moved when the element connecting it to the control means is actuated to cause actuation of the feeding tooth.

What is claimed is:

1. In record changing mechanism of the type having a motor board mounting the components of the mechanism, record edge-supporting and feeding means comprising, in combination, a record supporting platform disposed above the motor board and having a forward record-supporting end and a rear end; a record feeding element slidably supported on said platform for forward and rearward movement relative thereto; and a pair of link means extending upwardly from the motor board and constituting the sole support for said platform; the upper ends of said link means being pivotal on spaced, parallel forward and rear axes extending transversely relative to said platform, the lower ends of said link means being pivotal on correspondingly spaced lower axes fixed relative to the motor board and parallel to the upper axes, and the distances between the upper and lower pivotal axes of said link means being equal; said link means forming the upwardly extending elements of a parallel motion linkage supporting said platform for movement parallel to the common axial plane of the lower pivotal axes.

2. Record edge-supporting and feeding means as claimed in claim 1 wherein platform adjusting movement of said link means is effected by a manually operable cam lever pivotally mounted at a point fixed relative to said motor board, and having a camming connection to a point on one of said link means to adjust said link means and retain them in the adjusted position.

3. Record edge-supporting and feeding means as claimed in claim 1 including an actuating lever for the feeding element pivoted upon an intermediate portion of one of the link means and displaceable therewith, said lever being constructed for coupling to a member of the record changing mechanism.

4. Record edge-supporting and feeding means as claimed in claim 1 wherein said link means comprises a forward pair of axially spaced and transversely interconnected links pivoted at their lower ends in bracket elements secured to the motor board, and a rear pair of axially spaced and transversely interconnected links pivoted at their lower ends on said bracket elements at a lower level than said forward pair of links; and a link interconnecting the upper ends of a forward and rear link and integral with said platform.

5. A record edge supporting and feeding means as claimed in claim 4, wherein cover means are provided pivotally supported upon the upper forward pivotal axis and having a link attachment at its lower end to one of the brackets, the cover moving with and covering the parallel motion linkage at all positions.

6. A record edge supporting and feeding means as claimed in claim 3, wherein the feeding element is coupled to its actuating lever by a slotted link which is engaged by a hook formation in the element, the slotted link lying in a vertical plane and being guided in a slot in the supporting platform.

7. A record edge supporting and feeding means as claimed in claim 3, wherein the feeding element actuating lever is pivotally mounted intermediate its ends on the rear link means intermediate the upper and lower axes thereof, the length of the actuating lever being equal to the distance between such upper and lower pivotal axis, and the lower end of the actuating lever being immediately adjacent such lower pivotal axis so that the lower end of the actuating lever is not displaced as the supporting platform is adjusted.

References Cited in the file of this patent

UNITED STATES PATENTS

| | | |
|---|---|---|
| 2,235,693 | Wells | Mar. 18, 1941 |
| 2,271,001 | Fortune | Jan. 27, 1942 |
| 2,343,992 | Morrison | Mar. 14, 1944 |
| 2,636,742 | Redfield | Apr. 28, 1953 |

FOREIGN PATENTS

| | | |
|---|---|---|
| 418,583 | Great Britain | Oct. 25, 1934 |
| 459,155 | Great Britain | Jan. 4, 1937 |